(12) United States Patent
Shakil et al.

(10) Patent No.: US 10,927,888 B1
(45) Date of Patent: Feb. 23, 2021

(54) THRUST BEARINGS, ROTATING MACHINERY HAVING THRUST BEARINGS, AND METHODS OF MAKING THRUST BEARINGS

(71) Applicant: Hamilton Sundstrand Corporation, Charlotte, NC (US)

(72) Inventors: Ali Shakil, West Hartford, CT (US); Murtuza Lokhandwalla, South Windsor, CT (US); William R. Fiske, Springfield, MA (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/561,943

(22) Filed: Sep. 5, 2019

(51) Int. Cl.
*F16C 17/04* (2006.01)
*F16C 32/06* (2006.01)
*F16C 43/00* (2006.01)

(52) U.S. Cl.
CPC ............ *F16C 17/042* (2013.01); *F16C 43/00* (2013.01); *F16C 2223/30* (2013.01); *F16C 2226/00* (2013.01)

(58) Field of Classification Search
CPC ....................................................... F16C 17/042
See application file for complete search history.

(56) References Cited

U.S. PATENT DOCUMENTS

| | | | |
|---|---|---|---|
| 4,459,047 A * | 7/1984 | Silver | F16C 17/024 384/103 |
| 4,624,583 A * | 11/1986 | Saville | F16C 17/042 384/105 |
| 5,318,366 A * | 6/1994 | Nadjafi | F16C 27/02 384/105 |
| 5,498,082 A * | 3/1996 | Nadjafl | F16C 17/042 384/105 |
| 5,540,505 A | 7/1996 | Struziak | |
| 5,938,341 A * | 8/1999 | Eccles | F16C 27/08 384/105 |
| 6,752,533 B2 | 6/2004 | Saville et al. | |
| 7,297,367 B2 | 11/2007 | Oboodi et al. | |
| 7,648,279 B2 | 1/2010 | Struziak et al. | |
| 9,222,509 B2 | 12/2015 | Swanson et al. | |

(Continued)

FOREIGN PATENT DOCUMENTS

| | | | |
|---|---|---|---|
| EP | 0228251 A2 | 7/1987 | |
| SU | 637563 A1 * | 12/1978 | ............ F16C 17/042 |
| WO | 2011044110 A3 | 4/2011 | |

OTHER PUBLICATIONS

European Search Report for Application No. 19211228.2, dated Jul. 30, 2020, 125 pages.

*Primary Examiner* — Phillip A Johnson
(74) *Attorney, Agent, or Firm* — Cantor Colburn LLP (57) ABSTRACT

A thrust bearing arrangement includes a top plate extending about a rotation axis, a thrust plate extending about the rotation axis and axially offset from the top foil plate, and a bump plate. The thrust plate is orthogonal relative to the rotation axis. The bump foil plate extends about the rotation axis, is axially offset from the thrust plate, and has an annular portion and two or more bump plate foil portions. The annular portion of the bump plate is circumferentially interrupted by the bump plate foil portions of the bump plate. Rotating machines and methods of making thrust bearing arrangements for rotating machines are also described.

16 Claims, 7 Drawing Sheets

(56) References Cited

U.S. PATENT DOCUMENTS

| | | |
|---|---|---|
| 9,404,529 B2 | 8/2016 | Heshmat |
| 9,470,260 B2 | 10/2016 | Struziak et al. |
| 9,726,220 B2 * | 8/2017 | Kim ................. F16C 27/02 |
| 2015/0030270 A1 | 1/2015 | Heshmat |
| 2015/0362012 A1 | 12/2015 | Ermilov |
| 2017/0191522 A1 | 7/2017 | Kim |
| 2017/0356490 A1 * | 12/2017 | Santiago ............. F16C 43/02 |

* cited by examiner

THRUST BEARINGS, ROTATING MACHINERY HAVING THRUST BEARINGS, AND METHODS OF MAKING THRUST BEARINGS

BACKGROUND

The present disclosure generally relates to rotating machinery, and more particularly, to thrust bearings for supporting rotating machinery.

BRIEF DESCRIPTION

Hydrodynamic thrust bearings rely on relative rotation between a shaft, typically referred to as a thrust runner, and a bearing, to generate a non-linear fluid film between the thrust runner and the bearing. The fluid film forms when the relative rotation of the shaft and the bearing interacts with fluid to create and maintain pressurized wedges of fluid between the shaft and the bearing. The pressurized fluid wedge, in turn, transfers thrust or axial loads from the thrust runner to the bearing, the fluid typically being air or oil.

Hydrodynamic thrust bearings commonly include a plurality of bearing foils, generally referred to as top foils, a plurality of bump foils, and an annular support plate. The plurality of top foils and the plurality of bump foils are typically welded to the annular support plate to form the thrust bearing, which is then inserted between the shaft bearing. The welding process can be labor intensive and, because the annular plate is relatively thin, the welding process can distort the shape of the annular support plate due to the uneven heating of the annular support plate during the welding process. The distortions in the annular support plate in turn alters the fluid film formation between the bearing and the thrust runner, inhibiting fluid film in certain locations and decreasing bearing performance.

Such thrust bearings have generally been satisfactory for their intended purpose. However, there remains a need in the art for improved thrust bearings, rotating machinery having thrust bearing, and methods of making thrust bearings for rotating machinery.

BRIEF DESCRIPTION

A thrust bearing arrangement is provided. The thrust bearing arrangement includes a top plate extending about a rotation axis, a thrust plate extending about the rotation axis and axially offset from the top plate, the thrust plate orthogonal to the rotation axis, and a bump plate. The bump plate extends about the rotation axis and is axially offset from the thrust plate, the bump plate having a bump plate annular portion and two or more bump plate foil portions. The bump plate annular portion is circumferentially interrupted by the two or more bump plate foil portions.

In addition to one or more of the features described above, or as an alternative, further embodiments of the thrust bearing arrangement may include that the top plate has a top plate annular portion and two or more of top plate pad portions, top plate annular portion being circumferentially interrupted by the two or more top plate pad portions.

In addition to one or more of the features described above, or as an alternative, further embodiments of the thrust bearing arrangement may include the top plate annular portion has a radially inner periphery, the radially inner periphery of the top plate extending continuously about the rotation axis and at a singular radial offset from the rotation axis.

In addition to one or more of the features described above, or as an alternative, further embodiments of the thrust bearing arrangement may include that the top plate annular portion has a radially outer periphery, the radially outer periphery of the top plate annular portion extending continuously about the rotation axis and at a singular radial offset from the rotation axis.

In addition to one or more of the features described above, or as an alternative, further embodiments of the thrust bearing arrangement may include that the two or more top plate pad portions extend axially from the top plate annular portion in a direction axially opposite the bump plate.

In addition to one or more of the features described above, or as an alternative, further embodiments of the thrust bearing arrangement may include a solid film lubricant coating is conformally disposed over the top plate annular portion and the plurality of top plate pad portions.

In addition to one or more of the features described above, or as an alternative, further embodiments of the thrust bearing arrangement may include the thrust plate has a radially inner periphery and a radially outer periphery with two or more ramp portions defined therebetween, the radially inner periphery and the radially outer periphery each extending continuously about the rotation axis, the two or more ramp portions distributed circumferentially about the thrust plate.

In addition to one or more of the features described above, or as an alternative, further embodiments of the thrust bearing arrangement may include the bump plate annular portion has a radially inner periphery, the radially inner periphery of the bump plate annular portion extending continuously about the rotation axis and at a singular radial offset from the rotation axis.

In addition to one or more of the features described above, or as an alternative, further embodiments of the thrust bearing arrangement may include the bump plate annular portion has a radially outer periphery, the radially outer periphery of the bump plate annular portion extending continuously about the rotation axis and at a singular radial offset from the rotation axis.

In addition to one or more of the features described above, or as an alternative, further embodiments of the thrust bearing arrangement may include the two or more bump plate foil portions extend axially from the bump plate annular portion in a direction axially opposite the top plate.

In addition to one or more of the features described above, or as an alternative, further embodiments of the thrust bearing arrangement may include that the top plate has an anti-rotation feature, the thrust plate has an anti-rotation feature, and that the bump plate has an anti-rotation feature.

In addition to one or more of the features described above, or as an alternative, further embodiments of the thrust bearing arrangement may include that the top plate has a top plate annular body including a top plate annular portion interconnecting two or more top plate pad portions, the top plate annular body having no welds.

In addition to one or more of the features described above, or as an alternative, further embodiments of the thrust bearing arrangement may include that the bump plate has a bump plate annular body including the bump plate annular portion and the two or more bump plate foil portions, the bump plate annular portion interconnecting the two or more bump plate foil portions and having no welds.

A rotating machine is also provided. The rotating machine includes a thrust bearing arrangement as described above. The bump plate has a bump plate annular body including the bump plate annular portion and the two or more bump plate foil portions, the bump plate annular portion interconnecting the two or more of bump plate foil portions and the bump plate annular body having no welds. The top plate has a top plate annular portion and two or more top plate pad portions, the top plate annular portion being circumferentially interrupted by the two or more top plate pad portions. A stator member is arranged along the rotation axis and opposing the thrust bearing arrangement and a shaft member is arranged along the rotation axis and opposes the thrust bearing arrangement, the shaft member and the stator member defining therebetween a bearing chamber, and the thrust bearing arrangement is disposed within the bearing chamber.

In addition to one or more of the features described above, or as an alternative, further embodiments of the rotating machine may include a pressurized fluid source in fluid communication with the bearing chamber and a pressurized fluid return in fluid communication with the bearing chamber, the bearing chamber fluidly coupled the pressurized fluid source to the pressurized fluid return.

A method of making a thrust bearing arrangement is additionally provided. The method includes defining a top plate, a thrust plate, and a bump plate. The top plate is arranged about a rotation axis. The thrust plate is arranged about the rotation axis at a location axially offset from the top plate and orthogonal to the rotation axis. The bump plate is arranged about the rotation axis at a location axially offset from the thrust plate. Defining the bump plate includes defining a bump plate annular portion and a plurality of bump plate foil portions, the bump plate annular portion circumferentially interrupted by each of the bump plate foil portions. Arranging the bump plate about the rotation axis includes arranging the bump plate annular portion axially between the bump plate foil portions of the bump plate and the thrust plate.

In addition to one or more of the features described above, or as an alternative, further embodiments of the method may include photochemically etching a metallic sheet to define a top plate annular body, pressing the top plate annular body to define a top plate annular portion and a plurality of top plate pad portions, the top plate annular portion circumferentially interrupted by each of the top plate pad portions; and coating the top plate annular portion and the top plate pad portions with a solid film lubricant coating.

In addition to one or more of the features described above, or as an alternative, further embodiments of the method may include photochemically etching a metallic sheet to define a thrust plate annulus.

In addition to one or more of the features described above, or as an alternative, further embodiments of the method may include photochemically etching a metallic sheet to define a bump plate annular body, and pressing the bump plate annular body to define the bump plate annular body interconnecting the plurality of bump plate foil portions.

In addition to one or more of the features described above, or as an alternative, further embodiments of the method may include axially stacking the thrust plate between the top plate and the bump plate in a bearing chamber of a rotating machine.

Technical effects of the present disclosure include thrust bearings without the structural distortion that can result from welding. The present disclosure also provides thrust bearings with relatively long service life, exhibit relatively uniform wear during service, and which are relatively inexpensive in comparison to thrust bearings assembled using welding techniques.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
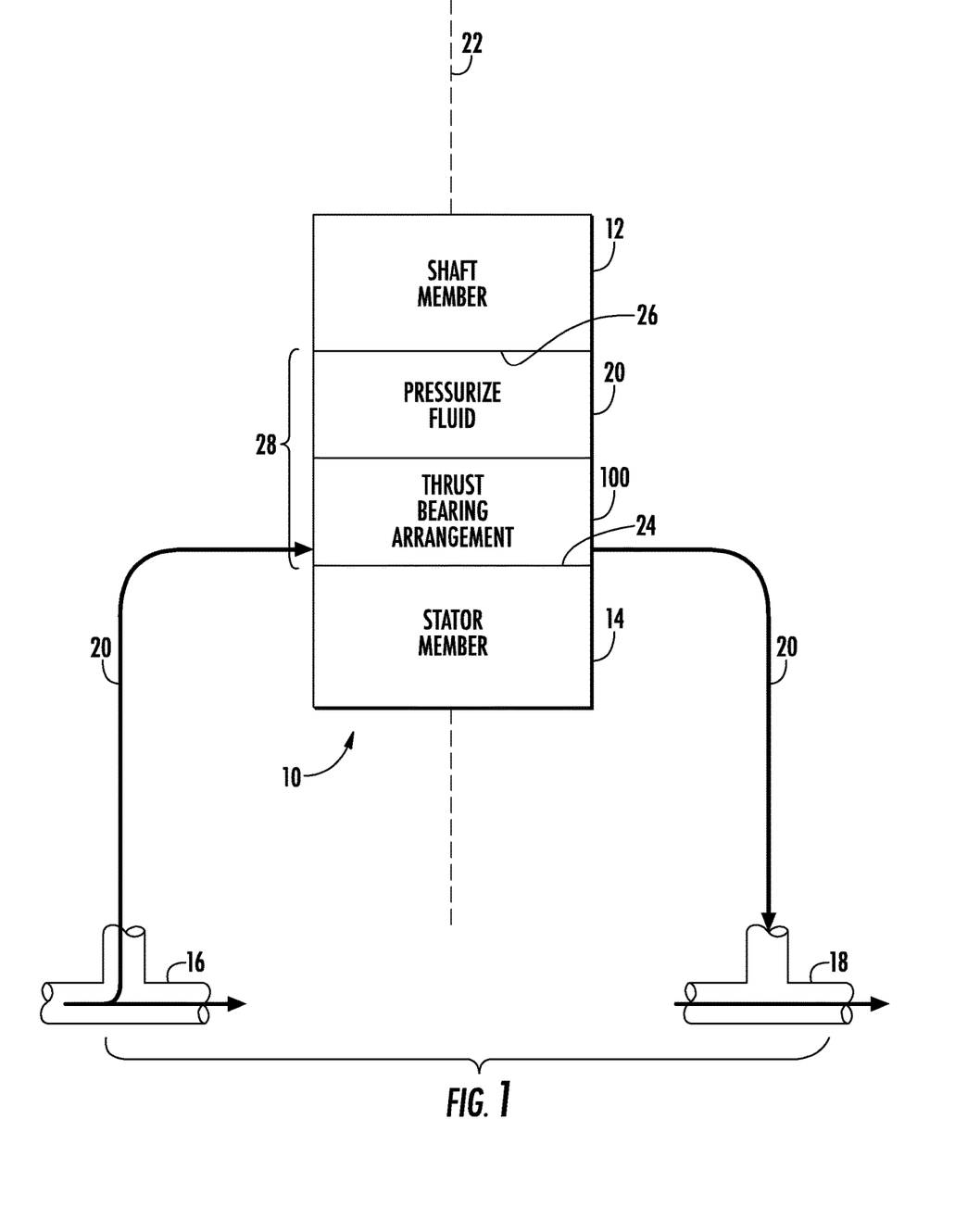
FIG. 1 is a perspective view of a rotating machine constructed in accordance with the present disclosure, showing a thrust bearing arrangement disposed between a shaft member and a stator member a rotation axis.

Reference will now be made to the drawings wherein like reference numerals identify similar structural features or aspects of the subject disclosure. For purposes of explanation and illustration, and not limitation, a partial view of an exemplary embodiment of a thrust bearing arrangement in accordance with the disclosure is shown in FIG. 1 and is designated generally by reference character 100. Other embodiments of thrust bearing arrangements, rotating machines having thrust bearing arrangements, and methods of making thrust bearing arrangements in accordance with the present disclosure, or aspects thereof, are provided in FIGS. 2-7, as will be described. The systems and methods described herein can be used for supporting rotating structures in rotating machines, such as turbines and compressors in air cycle machines, though the present disclosure is not limited to turbines and compressors, or to air cycle machines in general.

With reference to FIG. 1, a rotating machine 10, e.g., a compressor or a turbine for an air cycle machine, is shown. The rotating machine 10 includes a shaft member 12, a stator member 14, and the thrust bearing arrangement 100. The rotating machine 10 also includes a pressurized fluid source 16, a pressurized fluid return 18, and a pressurized fluid 20. In certain embodiments the pressurized fluid 20 can be air that is returned to the pressurized fluid source 16, e.g., in embodiments where the rotating machine 10 is an air cycle machine.

The stator member 14 is arranged along a rotation axis 22 and has a thrust bearing face 24. The shaft member 12 has a fluid face 26, is disposed along the rotation axis 22 and axially opposes the stator member 14 such that the fluid face 26 and the thrust bearing face 24 define therebetween one another a bearing chamber 28. The bearing chamber 28 is bounded by the thrust bearing face 24 of the stator member 14 and the fluid face 26 of the shaft member 12 and houses therein the thrust bearing arrangement 100. The pressurized fluid source 16 is in fluid communication with the pressurized fluid return 18 such that the pressurized fluid 20 at least partially occupies the bearing chamber 28, the pressurized fluid return 18 thereby fluidly coupled to the pressurized fluid source 16.

As will be appreciated by those of skill in the art in view of the present disclosure, the thrust bearing arrangement 100 can support the shaft member 12 for rotating relative to the stator member 14 by generating a hydrodynamic fluid film of sufficient pressure to axially separate the thrust bearing arrangement 100 from the shaft member 10. Axially separation allows the shaft member 12 to rotate relative to the stator member 14 with little friction (or substantially no friction). A fluid film can be generated from the pressurized fluid 20, for example, by coupling discrete hydrodynamic foil structures on a surface axially opposing the shaft member 12 with welds, and by further coupling discrete bump foil structures on a surface opposing the stator member 14 with additional welds.

As will also be appreciated by those of skill in the art in view of the present disclosure, the residual stress build-up resulting from welding, warpage associated with heating during welding, and uneven load distribution on the hydrodynamic foil tops due to the welding can accelerate wear of the thrust bearing arrangement. Further, the welding process itself can be relatively labor intensive, adding cost to the thrust bearing arrangement. To limit (or eliminate entirely) the tendency of uneven wear and/or limit cost the thrust bearing arrangement 100 is provided.

Figure 2:
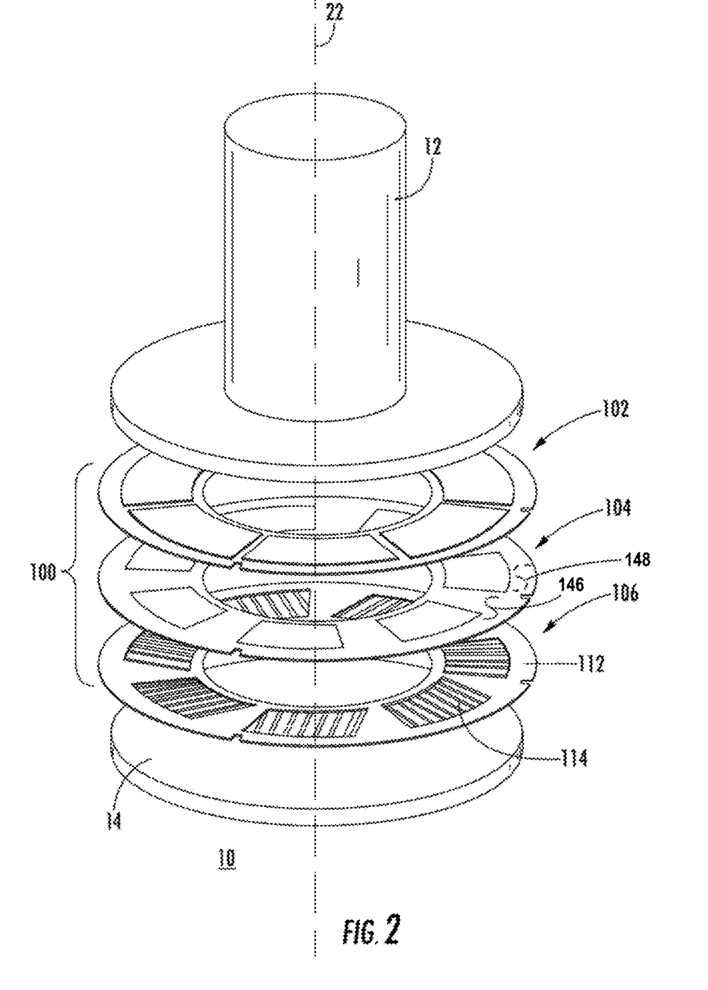
FIG. 2 is an exploded view of a portion of the rotating machine of FIG. 1 including the thrust bearing arrangement, showing a top late, a thrust plate, a bump plate the thrust bearing arrangement according to an illustrative embodiment of the thrust bearing arrangement.

With reference to FIG. 2, the thrust bearing arrangement 100 is shown. The thrust bearing arrangement 100 includes a top plate 102 extending about the rotation axis 22, a thrust plate 104 extending about the rotation axis 22 and axially offset from the top plate 102, and a bump plate 106. The thrust plate 104 is orthogonal relative to the rotation axis 22. The bump plate 106 extends about the rotation axis 22, is axially offset from the thrust plate 104, and has a bump plate annular portion 112 and a plurality of bump plate foil portions 114. The bump plate annular portion 112 is circumferentially interrupted by the plurality of bump plate foil portions 114.

Figure 3:
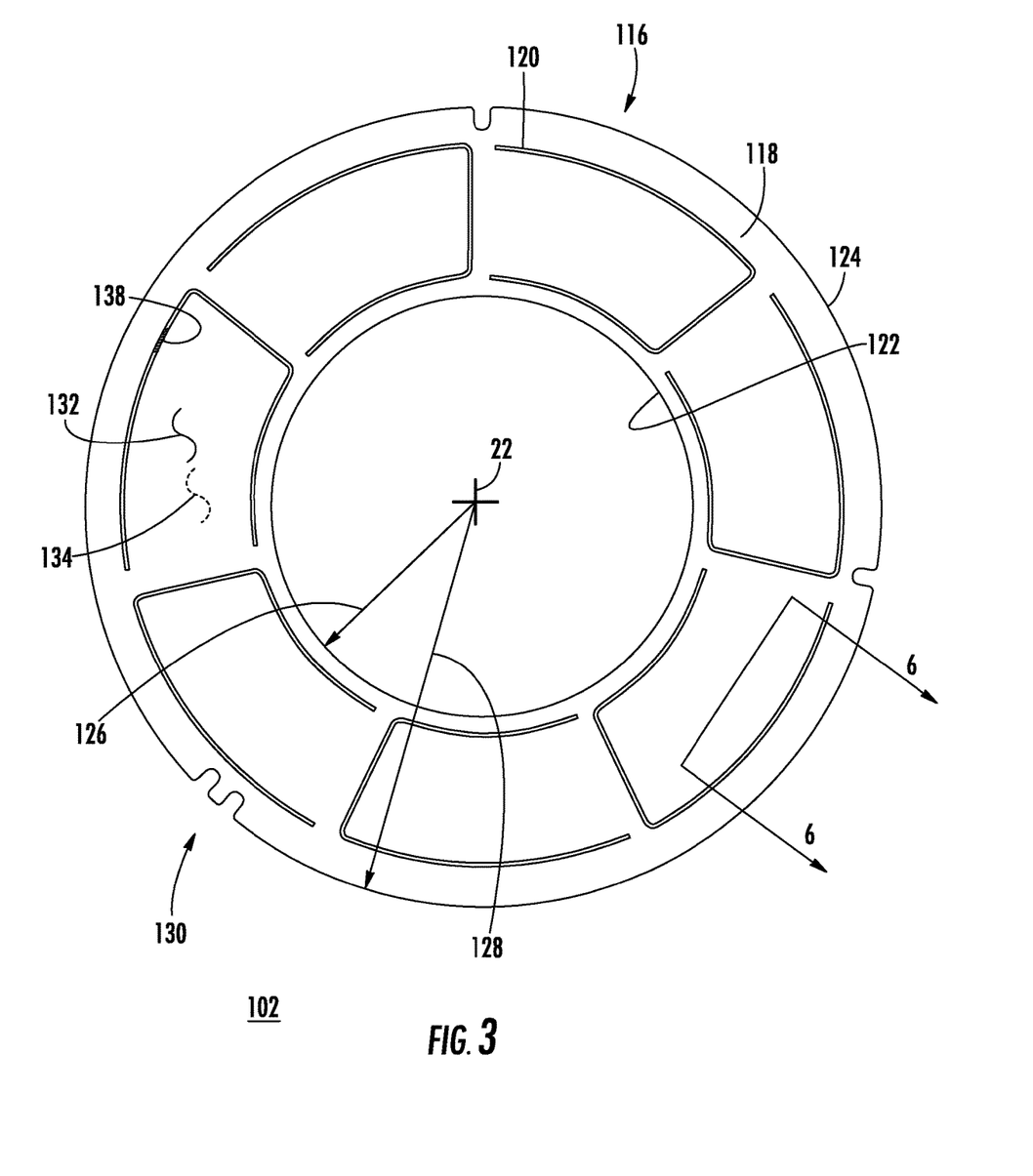
FIG. 3 is a plan view of the top plate of the thrust bearing arrangement of FIG. 1, showing a top plate annular body of the top plate with a top plate annular portion extending about the rotation axis and a plurality of top plate foil portions circumferentially distributed about the rotation axis.
Figure 6:
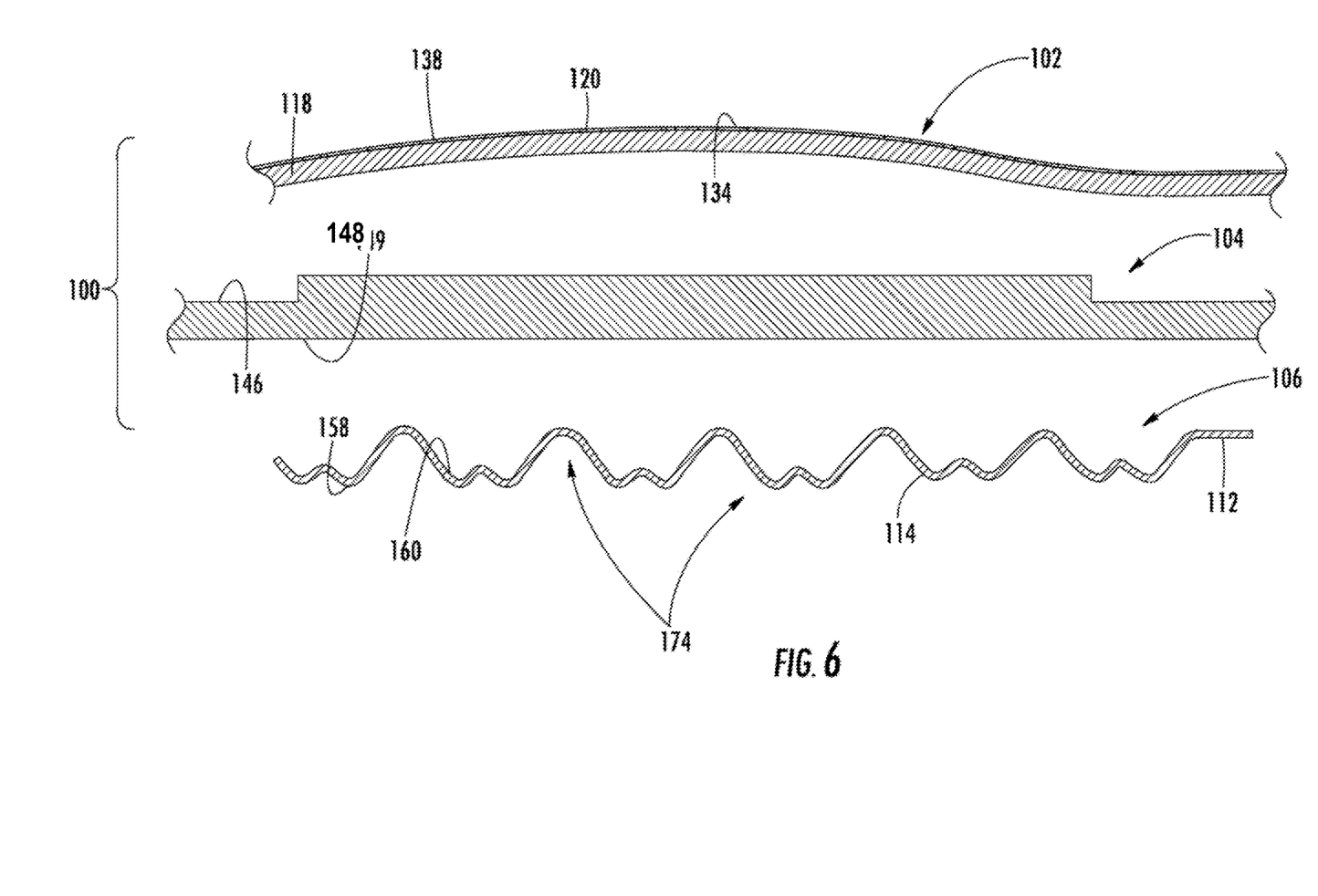
FIG. 6 is a partial cross-sectional view of the bearing arrangement of FIG. 1, showing the top plate annular portion of the top plate circumferentially interrupted by a top plate pad portion and the bump plate annular portion of the bump plate circumferentially interrupted by a bump plate foil portion.

With reference to FIGS. 3 and 6, an example of the top plate 102 is shown. The top plate 102 includes a top plate annular body 116. The top plate annular body 116 has a top plate annular portion 118 and a plurality of top plate pad portions 120. The top plate annular portion 118 is circumferentially interrupted by the plurality of top plate pad portions 120, the top plate annular portion 118 interconnecting circumferentially adjacent top plate pad portions 120. It is contemplated that the top plate pad portions 120 and the top plate annular portion 118 be formed from a singular piece of sheet stock, the top plate pad portions 120 and the top plate annular portion 118 thereby being monolithic in arrangement. This avoids the need to fix, e.g., via welding, pads to an underlying plate structure, simplifying the fabrication of the top plate 102. In certain embodiments the top plate 102 is formed from a pressed sheet of metal, such as carbon or stainless steel by way of non-limiting example.

The top plate annular portion 118 has a radially inner periphery 122 and a radially outer periphery 124. The radially inner periphery 122 extends circumferentially about the rotation axis 22 continuously at a singular radial offset 126 from the rotation axis 22. The radially outer periphery 124 extends circumferentially about the radially inner periphery 122 and is disposed radially outward of the radially inner periphery 122. In the illustrated embodiment the radially outer periphery 124 of the top plate annular portion 118 extends continuously about the rotation axis 22 at a singular radial offset 128. It is contemplated that the top plate annular portion 118 defines an anti-rotation feature 130 configured to fix the top plate 102 in rotation about the rotation axis 22 relative to the shaft member 12 (shown in FIG. 1) or the stator member 14 (shown in FIG. 1), as suitable for a given application. In certain embodiments the anti-rotation feature 130 allows for fixation of the top plate 102 to a stator, e.g., the stator member 14 (shown in FIG. 1). In accordance with certain embodiments, the anti-rotation feature 130 also allows for error-proofing the assembly of the thrust bearing arrangement 100 (shown in FIG. 1). It is also contemplated that the running torque exerted by the rotating structure, e.g., the shaft structure 12 (shown in FIG. 1) supported by the thrust bearing arrangement 100 be reacted by forces provided by fixation of the anti-rotation feature on each of foils forming the thrust bearing assembly, e.g., the anti-rotation feature 130 (shown in FIG. 3), the anti-rotation feature 154 (shown in FIG. 4), and the anti-rotation feature 170 (shown in FIG. 5).

The top plate pad portions 120 extend axially from the top plate annular portion 118 and are distributed circumferentially about the rotation axis 22. In this respect top plate annular portion 118 has a shaft-facing surface 132 and an opposite thrust plate-facing surface 134, the shaft-facing surface 132 opposing the shaft member 12 (shown in FIG. 1), and thrust plate-facing surface 134 facing the thrust plate 104 (shown in FIG. 2), and the top plate pad portions 120 each extending continuously, i.e., with no gap therebetween about a periphery of the respective top plate pad portions 120 and the top plate annular portion 118, in the direction of the shaft member 12. It is contemplated that surfaces 136 of the top plate pad portions 120 are arranged axially between the shaft member 12 and shaft-facing surface 132 of the top plate annular portion 118. In the illustrated embodiments a solid film lubricant coating 138 is disposed, e.g., conformally disposed, over the shaft-facing surface 132 of the top plate annular body 116, limiting wear during startup and shutdown of the rotating machine 10.

Figure 4:
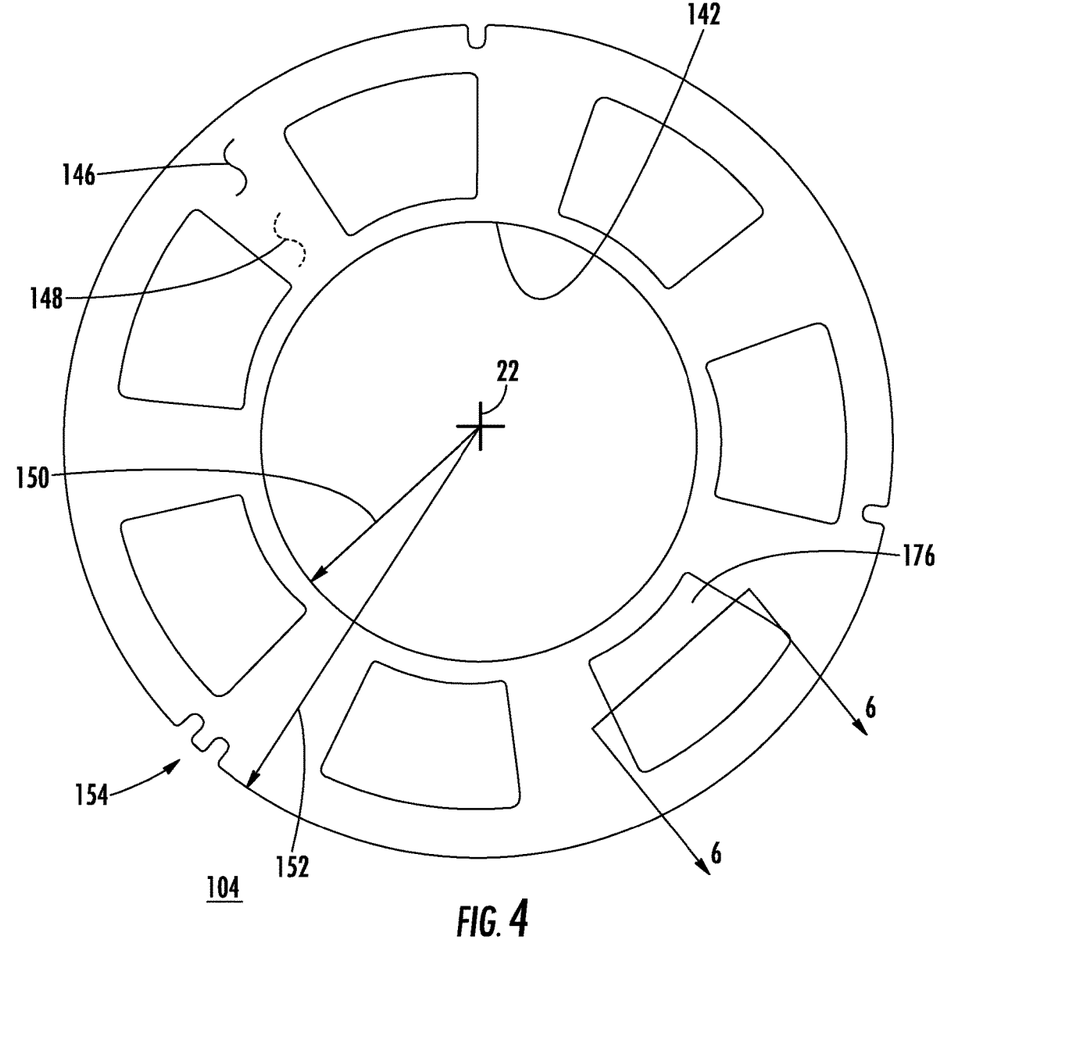
FIG. 4 is a plan view of the thrust plate of the thrust bearing arrangement of FIG. 1, showing a thrust plate annulus of the thrust plate extending about the rotation axis.

With reference to FIGS. 4 and 6, the thrust plate 104 is shown. The thrust plate 104 includes a thrust plate annulus 140 with a plurality of ramp portions 176 distributed about the thrust plate annulus 104. The thrust plate annulus 140 has a radially inner periphery 142, a radially outer periphery 144, a top foil plate-facing surface 146, and a bump foil plate-facing surface 148. The radially inner periphery 142 extends continuously about the rotation axis 22 and is radially offset therefrom by an inner periphery radial offset 150. The radially outer periphery 144 extends continuously about the rotation axis 22, is located radially outward of the radially inner periphery 142, and is radially offset from the rotation axis 22 by an outer periphery radial offset 152. It is contemplated that the radially outer periphery 144 extend circumferentially about the radially inner periphery 142, the thrust plate annulus 140 thereby being monolithic and continuous therebetween.

The top foil plate-facing surface 146 axially opposes the top plate 102 (shown in FIG. 2) and extends continuously between the radially inner periphery 142 and the radially outer periphery 144 of the thrust plate annulus 140. The bump foil plate-facing surface 148 extends continuously between the radially inner periphery 142 and the radially outer periphery 144, axially opposes the bump plate 106, and extends continuously between the radially inner periphery 142 and the radially outer periphery 144 of the thrust plate annulus 140. It is contemplated that the thrust plate annulus 140 be formed from a metallic sheet, such as carbon or stainless steel by way of non-limiting example. In certain embodiments the thrust plate 104 can include an anti-rotation feature 154, fixing the thrust plate 104 relative to the shaft member 12 (shown in FIG. 1) or the stator member 14 (shown in FIG. 1), simplifying assembly of the thrust bearing arrangement 100 (shown in FIG. 1).

The plurality of ramp portions 176 define a portion of the top plate-facing surface 146 and are arranged axially between the top foil plate 102 and the thrust plate annulus 140. It is contemplated that the ramp portions 176 vary in axial height circumferentially, the plurality of ramp portions 176 thereby providing hydrodynamic lift within the bearing arrangement 100 (shown in FIG. 1). The contour of the plurality of ramp portions 176 can be defined, for example, using a photochemical etching technique by way of non-limiting example.

Figure 5:
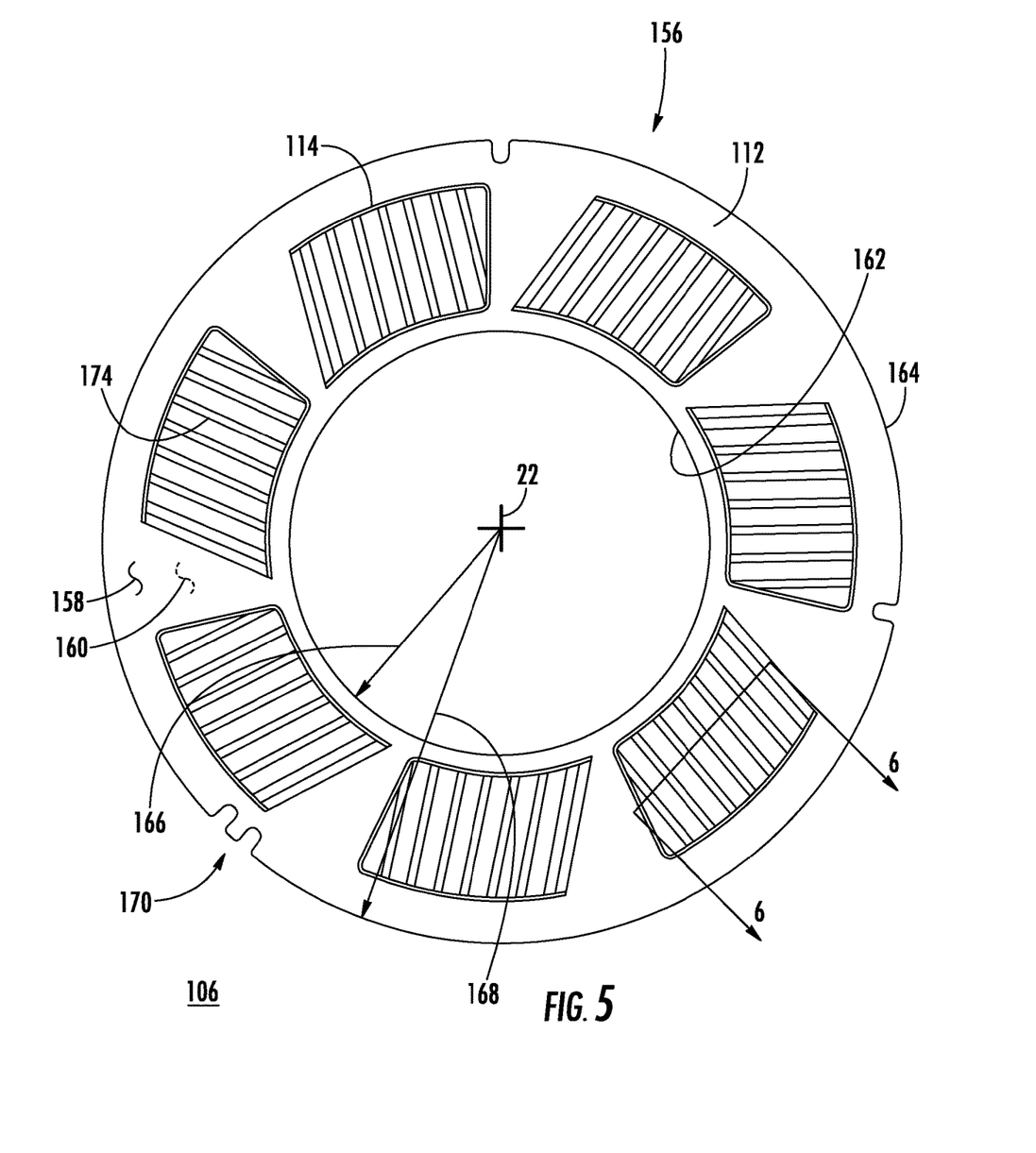
FIG. 5 is a perspective view of the bump plate of the thrust bearing arrangement of FIG. 1, showing a bump plate annular body having a bump plate annular portion extending about the rotation axis and a plurality of bump plate foil portions circumferentially distributed about the rotation axis.

With reference to FIGS. 5 and 6, the bump plate 106 is shown. The bump plate 106 has a bump plate annular body 156. The bump plate annular body 156 has the bump plate annular portion 112, the plurality of bump plate foil portions 114, a thrust plate-facing surface 158, and a stator member-facing surface 160. The bump plate annular portion 112 is circumferentially interrupted by the plurality of bump plate foil portions 114, the bump plate annular portion interconnecting circumferentially adjacent bump plate foil portions 114. The bump plate annular portion 112 has a radially inner periphery 162 and a radially outer periphery 164. In certain embodiments the bump plate 106 is formed from a pressed metal sheet, such as a carbon or stainless-steel sheet member by way of non-limiting example.

The radially inner periphery 162 of the bump plate annular portion 112 extends circumferentially about the rotation axis 22, and in the illustrated embodiment extends continuously about the rotation axis 22 without interruption at a singular inner periphery radial offset 166. The radially outer periphery 164 of the bump plate annular portion 112 extends circumferentially about the radially inner periphery 162 and is disposed radially outward of the radially inner periphery 162. In the illustrated embodiment the radially outer periphery 164 of the bump plate annular body 156 extends continuously about the rotation axis 22 at a singular outer periphery radial offset 168. In the illustrated embodiment the bump plate 106 has an anti-rotation feature 170, which fixes the bump plate 106 to one of the shaft member 12 or the stator member 14 and/or simplifies the assembly of the thrust bearing arrangement 100 (shown in FIG. 1).

The thrust plate-facing surface 158 of the bump plate 106 opposes the thrust plate 104 along the rotation axis 22. The stator member-facing surface 160 is located on a side of the bump plate annular body 156 axially opposite the thrust plate-facing surface 158 and axially opposes the stator member 14. The bump plate foil portions 114 extend from the bump plate annular portion 112, i.e., extending axially from the stator member-facing surface 160, and are distributed circumferentially about the rotation axis 22. In this respect bump plate foil portions 114 are arranged axially between the stator member-facing surface 160 and the stator member 14. It is contemplated that bump plate foil portions 114 each define hydrodynamic features 174, e.g., corrugations, configured to generate a hydrodynamic film between the top plate 102 (shown in FIG. 2) and the shaft member 12 (shown in FIG. 1). It is also contemplated that the bump plate foil portions 114 each extend continuously, i.e., with no gap therebetween about a periphery 172 of the respective bump plate foil portions 114 and the bump plate annular portion 112 in the direction of the stator member 14. This avoids the need to fix, e.g., via welding, discrete bump foil structures to a supporting structure, simplifying the fabrication of the bump plate 106.

In certain embodiments each of the bump plate foil portions 114 can be axially registered with a respective one of the plurality of top plate pad portions 120 (shown in FIG. 3). In accordance with certain embodiments each of the bump plate foil portions 114 can be circumferentially offset from one of the plurality of top plate pad portions 120. It is also contemplated that number of top plate pad portions 120 defined by the bump plate 106 can be equivalent to the number of top plate pad portions 120. In further embodiments the bearing arrangement can include seven (7) bump plate foil portions 114.

Figure 7:
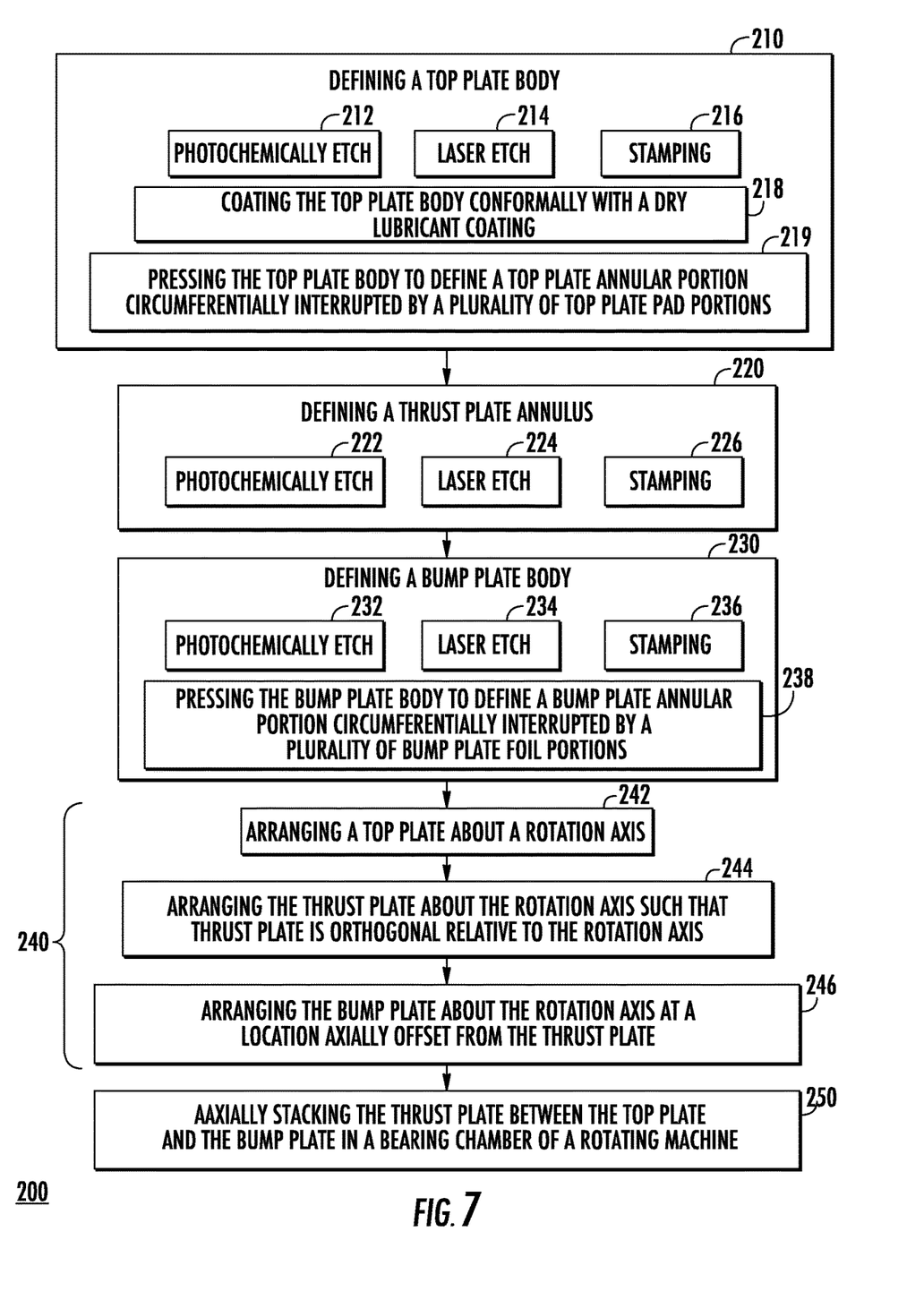
FIG. 7 is a block diagram of a method of making a thrust bearing arrangement according to the present disclosure, showing operations of the method according to an illustrative and non-limiting embodiment of the present disclosure.

With reference to FIG. 7, a method 200 of making a thrust bearing arrangement, e.g., the thrust bearing arrangement 100 (shown in FIG. 1), is shown. The method 200 of making the thrust bearing generally includes defining a top plate, e.g., the top plate 102 (shown in FIG. 2), as shown with box 210. The method 200 also includes defining a thrust plate, e.g., the thrust plate 104 (shown in FIG. 2), as shown with box 220. The method 200 additionally includes defining a bump plate having a plurality of bump plate ramp portions, e.g., the bump plate 106 (shown in FIG. 2), as shown with box 230.

Defining the top plate includes defining a top plate body, e.g., the top plate annular body 116 (shown in FIG. 3), as shown with box 210. It is contemplated that the top plate body be formed from metal sheet, e.g., foil, using a photochemical etching technique, as shown with box 212. It is contemplated that the top plate body can be formed from metal sheet using a laser etch technique or a stamping process, as shown with box 214 and box 216. Photochemically etching the top plate body with a photochemical etch technique can simplify the fabrication process by reducing (or eliminating entirely) the need to deburr or remove slag from the top plate body subsequent to forming the top plate body.

Once the top plate body is defined a solid film lubricant coating is conformally disposed over the top plate body, e.g., the solid film lubricant coating 138 (shown in FIG. 3). The coated top plate body is thereafter pressed, i.e. in a pressing operation, to define a top plate annular portion, e.g., the top plate annular portion 118 (shown in FIG. 3), circumferentially interrupted by a plurality of top plate pad portions, e.g., the top plate pad portions 120 (shown in FIG. 3), as shown with box 219. As will be appreciated by those of skill in the art in view of the present disclosure, pressing the top plate body to define the plurality of top plate pad portions and the top plate annular portion eliminates the need to weld discrete pad structures to an underlying support structure, limiting (or eliminating entirely) residual stress and warpage associated with welding techniques.

Defining the thrust plate includes defining a thrust plate body, e.g., the thrust plate annulus 140 (shown in FIG. 4), as shown with box 220. It is contemplated that the thrust plate body be formed from metal sheet, e.g., foil, using a photochemical etching technique, as shown with box 222. It is contemplated that the top plate body can be formed from metal sheet using a laser etch technique or a stamping process, as shown with box 224 and box 226. As above, photochemically etching the thrust plate body with a photochemical etch technique can also simplify the fabrication process of the thrust plate by reducing (or eliminating entirely) the need to deburr or remove slag from the trust plate body subsequent to forming the thrust plate body.

Defining the bump plate includes defining a bump plate body, e.g., the bump plate annular body 156 (shown in FIG. 5), as shown with box 230. It is contemplated that the bump plate body be formed from metal sheet, e.g., foil, using a photochemical etching technique, as shown with box 232. It is contemplated that the bump plate body can be formed from metal sheet using a laser etch technique or a stamping process, as shown with box 234 and box 236. Photochemically etching the bump plate body with a photochemical etch technique can simplify the fabrication process by reducing (or eliminating entirely) the need to deburr or remove slag from the bump plate body subsequent to forming the bump plate body.

Once the bump plate body is formed the bump plate body is thereafter pressed, i.e. in a pressing operation, to define a bump plate annular portion, e.g., the bump plate annular portion 112 (shown in FIG. 5), circumferentially interrupted by a plurality of bump plate pad portions, e.g., the bump plate foil portions 114 (shown in FIG. 5), as shown with box 236. As will be appreciated by those of skill in the art in view of the present disclosure, pressing the bump plate body to define the plurality of bump plate foil portions and the bump plate annular portion eliminates the need to weld discrete hydrodynamic foil structures to an underlying support structure, limiting (or eliminating entirely) warpage and residual stress within the top plate that can be associated with welding techniques. In addition, hydrodynamic structures, e.g., the hydrodynamic features 174 can also be defined in the pressing operation, simplifying fabrication by eliminating the need for the hydrodynamic structures to be formed in a separate operation.

As shown with bracket 240, a thrust bearing arrangement, e.g., the thrust bearing arrangement 100 (shown in FIG. 1), can be formed using the top plate, the thrust plate, and the bump plate. For example, the top plate can be arranged about a rotation axis, e.g., the rotation axis 22 (shown in FIG. 1), as shown with box 242, the thrust plate arranged about the rotation axis such that the thrust plate is orthogonal relative to the rotation axis, as shown with box 244, and the bump plate arranged about the rotation axis at a location axially offset from the thrust plate and on a side the thrust plate opposite the top plate, as shown with box 246. Arranging the top plate and the bump plate on axially opposite sides of the thrust plate allows the thrust bearing arrangement to serve as a drop-in replacement for a weldment-type thrust bearing, limiting the need to alter the configuration of a rotating machine incorporating the thrust bearing arrangement. It is contemplated that the top plate, the thrust plate, and the bump be arranged within a bearing chamber of a rotating machine, e.g., the bearing chamber 28 (shown in FIG. 1) or the rotating machine 10 (shown in FIG. 1). For example, the arrangement can be established in a stacking operation by aligning each of the top plate, the thrust plate.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A thrust bearing arrangement, comprising:
   a top plate extending about a rotation axis;
   a thrust plate extending about the rotation axis and axially offset from the top plate, the thrust plate orthogonal to the rotation axis; and
   a bump plate extending about the rotation axis and axially offset from the thrust plate, the bump plate having a bump plate annular portion and a plurality of bump plate foil portions, wherein the bump plate annular portion is circumferentially interrupted by the plurality of bump plate foil portions, wherein:
   the plurality of bump plate foil portions extend axially from the bump plate annular portion in a direction axially opposite the top plate;
   the top plate has a top plate annular portion and a plurality of top plate pad portions, wherein the top plate annular portion is circumferentially interrupted by the plurality of top plate pad portions, wherein a solid film lubricant coating is conformally disposed over the top plate annular portion and the plurality of top plate pad portions, and
   the thrust plate has a radially inner periphery and a radially outer periphery with a plurality of ramp portions defined therebetween, the radially inner periphery and the radially outer periphery each, except at an anti-rotation feature on the radial outer periphery, extending continuously about the rotation axis, the plurality of ramp portions distributed circumferentially about the thrust plate.

2. The thrust bearing arrangement of claim 1, wherein the top plate annular portion has a radially inner periphery, the radially inner periphery of the top plate extending continuously about the rotation axis and at a singular radial offset from the rotation axis.

3. The thrust bearing arrangement of claim 1, wherein the top plate annular portion has a radially outer periphery, the radially outer periphery of the top plate annular portion, except at an anti-rotation feature on the radial outer periphery, extending continuously about the rotation axis and at a singular radial offset from the rotation axis.

4. The thrust bearing arrangement of claim 1, wherein the plurality of top plate pad portions extend axially from the top plate annular portion in a direction axially opposite the bump plate.

5. The thrust bearing arrangement of claim 1, wherein the bump plate annular portion has a radially inner periphery, the radially inner periphery of the bump plate annular portion extending continuously about the rotation axis and at a singular radial offset from the rotation axis.

6. The thrust bearing arrangement of claim 1, wherein the bump plate annular portion has a radially outer periphery, the radially outer periphery of the bump plate annular portion, except at an anti-rotation feature on the radial outer periphery, extending continuously about the rotation axis and at a singular radial offset from the rotation axis.

7. The thrust bearing arrangement of claim 1, wherein the top plate has an anti-rotation feature, wherein the thrust plate has an anti-rotation feature, and wherein the bump plate has an anti-rotation feature.

8. The thrust bearing arrangement of claim 1, wherein the top plate has a top plate annular body including a top plate annular portion interconnecting a plurality of top plate pad portions, the top plate annular body having no welds.

9. The thrust bearing arrangement of claim 1, wherein the bump plate has a bump plate annular body including the bump plate annular portion and the plurality of bump plate foil portions, the bump plate annular portion interconnecting the plurality of bump plate foil portions, the bump plate annular body having no welds.

10. A rotating machine, comprising:
a thrust bearing arrangement as recited in claim 1, wherein the bump plate has a bump plate annular body including the bump plate annular portion and the plurality of bump plate foil portions, the bump plate annular portion interconnecting the plurality of bump plate foil portions, the bump plate annular body having no welds,
wherein the top plate has a top plate annular portion and a plurality of top plate pad portions, wherein the top plate annular portion is circumferentially interrupted by the plurality of top plate pad portions;
a stator member arranged along the rotation axis and opposing the thrust bearing arrangement; and
a shaft member arranged along the rotation axis and opposing the thrust bearing arrangement, the shaft member and the stator member defining therebetween a bearing chamber, wherein the thrust bearing arrangement is disposed within the bearing chamber.

11. The rotating machine of claim 10, further comprising:
a pressurized fluid source in fluid communication with the bearing chamber; and
a pressurized fluid return in fluid communication with the bearing chamber, the bearing chamber fluidly coupled the pressurized fluid source to the pressurized fluid return.

12. A method of making a thrust bearing, comprising:
defining a top plate, a thrust plate, and a bump plate;
arranging the top plate about a rotation axis;
arranging the thrust plate about the rotation axis at a location axially offset from the top plate and orthogonal to the rotation axis; and
arranging the bump plate about the rotation axis at a location axially offset from the thrust plate, wherein defining the bump plate includes defining a bump plate annular portion and a plurality of bump plate foil portions, the bump plate annular portion circumferentially interrupted by each of the bump plate foil portions,
wherein arranging the bump plate about the rotation axis includes arranging the bump plate annular portion axially between the bump plate foil portions of the bump plate and the thrust plate, wherein:
the plurality of bump plate foil portions extend axially from the bump plate annular portion in a direction axially opposite the top plate;
the top plate has a top plate annular portion and a plurality of top plate pad portions, wherein the top plate annular portion is circumferentially interrupted by the plurality of top plate pad portions, wherein a solid film lubricant coating is conformally disposed over the top plate annular portion and the plurality of top plate pad portions, and
the thrust plate has a radially inner periphery and a radially outer periphery with a plurality of ramp portions defined therebetween, the radially inner periphery and the radially outer periphery each, except at an anti-rotation feature on the radial outer periphery, extending continuously about the rotation axis, the plurality of ramp portions distributed circumferentially about the thrust plate.

13. The method of claim 12, further comprising:
photochemically etching a metallic sheet to define a top plate annular body;
pressing the top plate annular body to define a top plate annular portion and a plurality of top plate pad portions, the top plate annular portion circumferentially interrupted by each of the top plate pad portions; and
coating the top plate annular portion and the top plate pad portions with a solid film lubricant coating.

14. The method of claim 12, further comprising photochemically etching a metallic sheet to define a thrust plate annulus.

15. The method of claim 12, further comprising:
photochemically etching a metallic sheet to define a bump plate annular body; and
pressing the bump plate annular body to define the bump plate annular body interconnecting the plurality of bump plate foil portions.

16. The method of claim 12, further comprising axially stacking the thrust plate between the top plate and the bump plate in a bearing chamber of a rotating machine.

* * * * *